July 28, 1959  G. K. HAUSE  2,896,471
TRANSMISSION CONTROL
Filed July 3, 1958  4 Sheets-Sheet 1
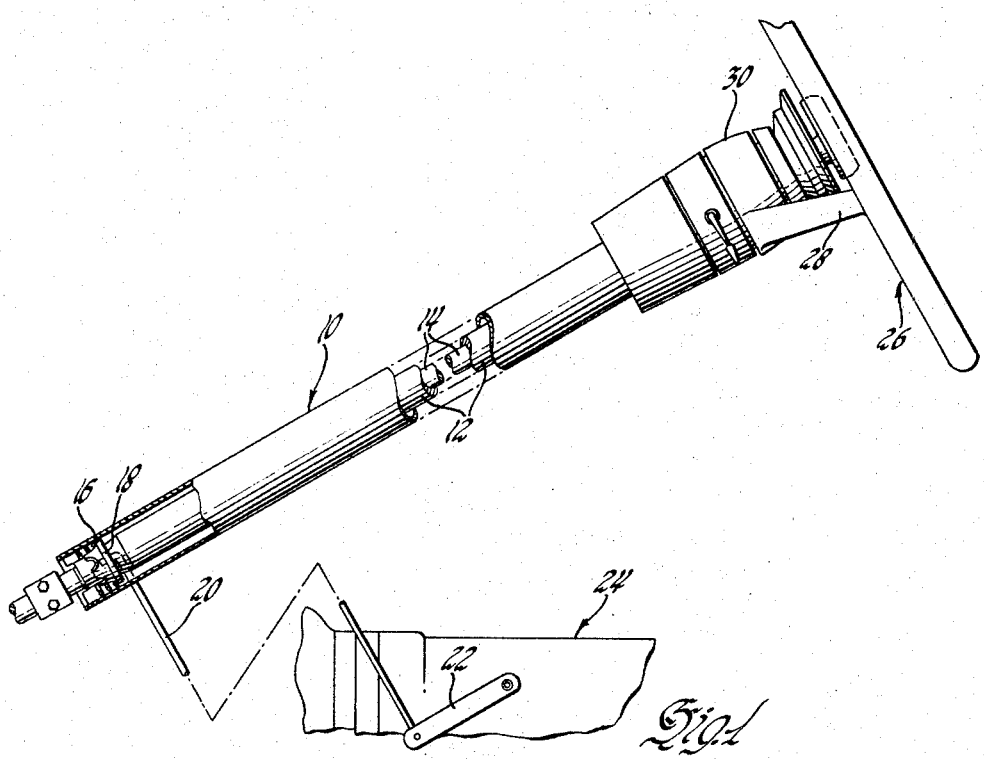
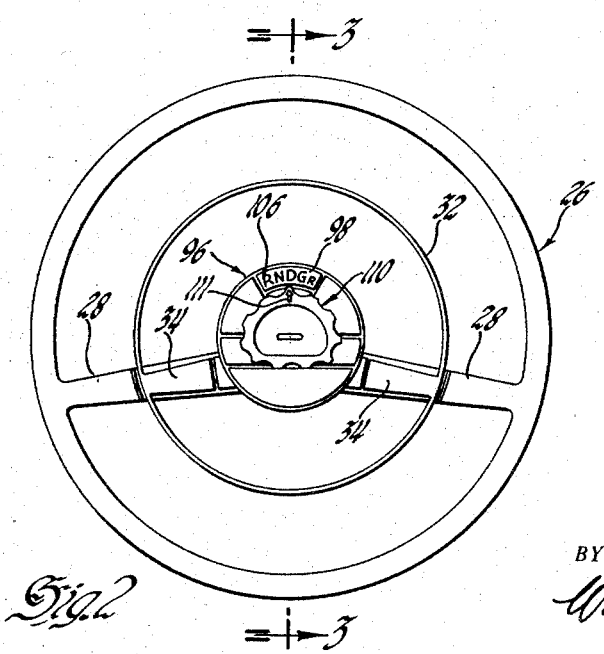
INVENTOR.
Gilbert K. Hause
BY
W. C. Middleton
ATTORNEY

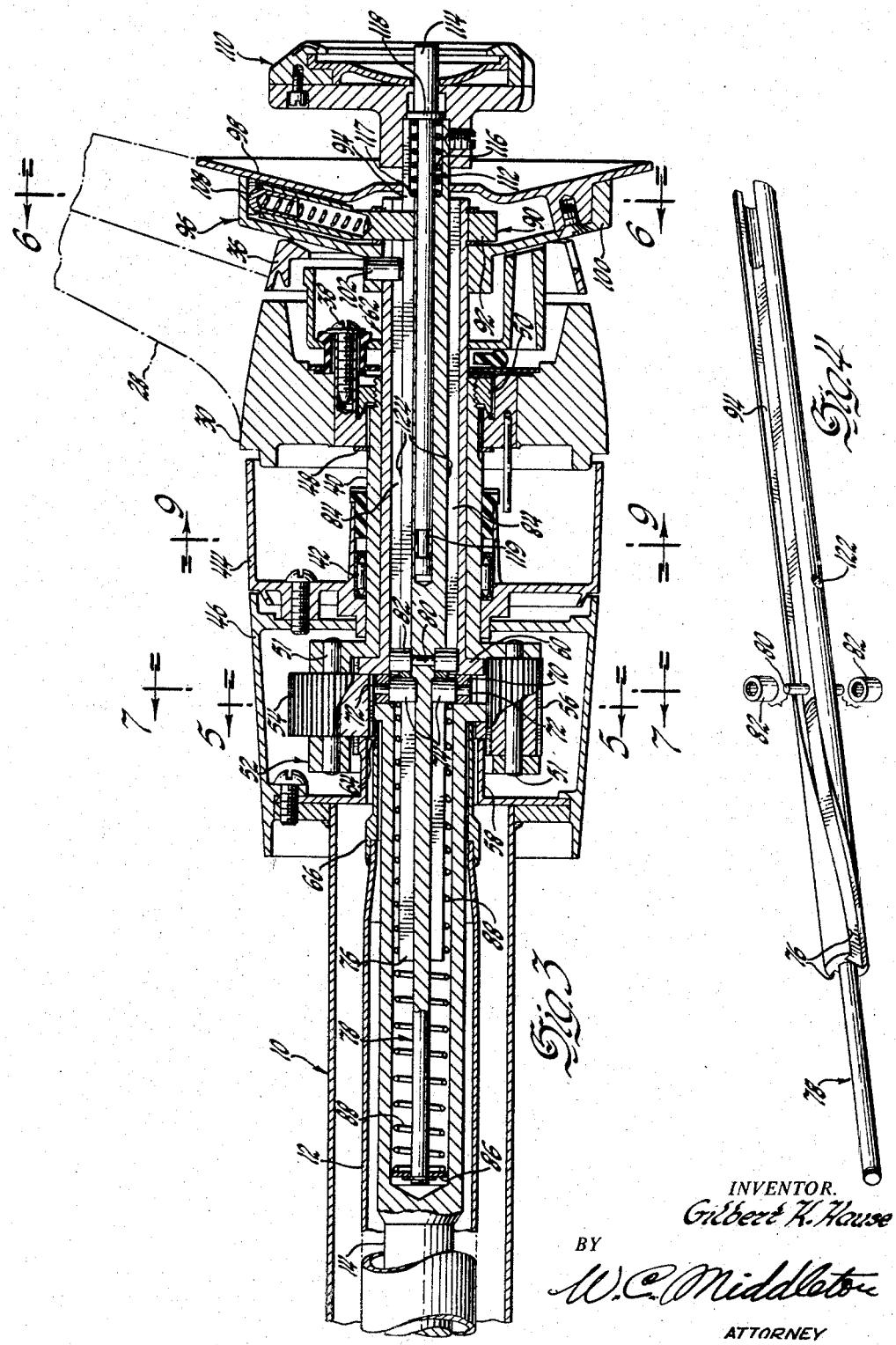

July 28, 1959
G. K. HAUSE
2,896,471
TRANSMISSION CONTROL
Filed July 3, 1958
4 Sheets-Sheet 3
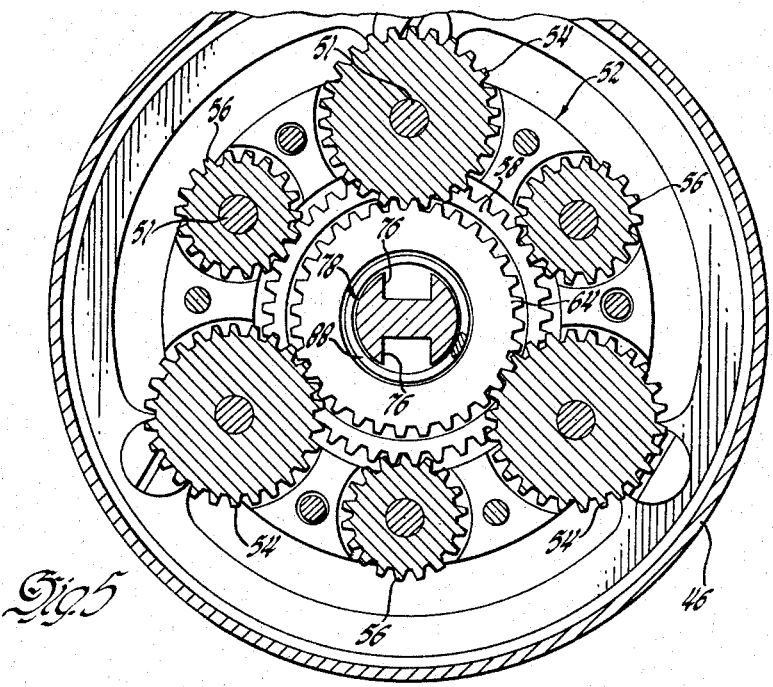
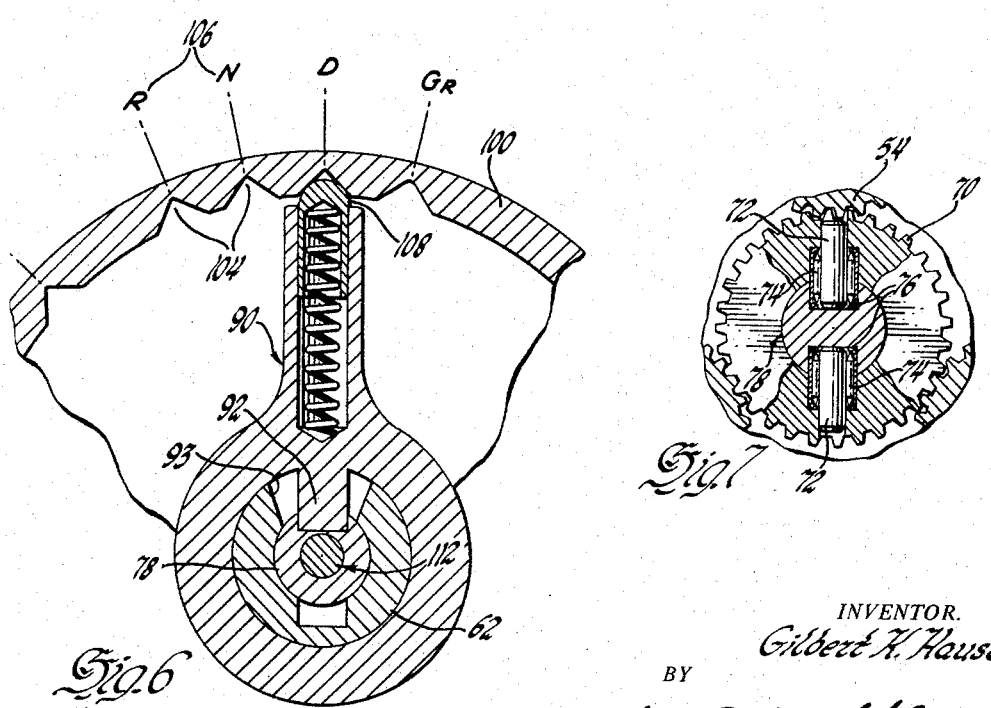
INVENTOR.
Gilbert K. Hause
BY
W.C. Middleton
ATTORNEY

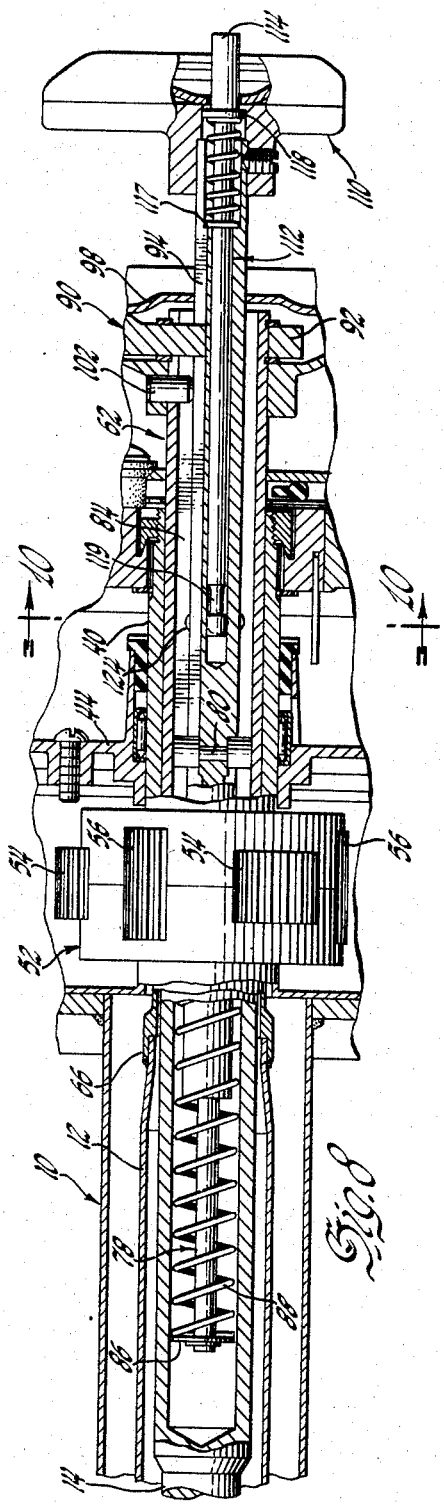

United States Patent Office 2,896,471
Patented July 28, 1959

2,896,471

TRANSMISSION CONTROL

Gilbert K. Hause, Franklin, Mich., assignor to General Motors Corporation, Detroit, Mich., a corporation of Delaware Application July 3, 1958, Serial No. 746,454

14 Claims. (Cl. 74—484)

This invention relates to improvements in motor vehicle controls, and particularly to transmission controls of the character that are combinable with the vehicle steering column.

In motor vehicle controls, accessibility to the driver, as well as simplicity in operation, are important concerns. With transmission controls being exemplary, it is desirable to have the transmission control member, such as a lever, knob or equivalent, above the hub of the steering wheel rather than below as is the usual practice. However, when the control member is above the steering wheel hub, there is a problem of interconnecting the transmission control member with the transmission control shaft through the hub of the steering wheel, particularly when the transmission control shaft is outside the steering shaft. Further complicating the problem is the desire to have the transmission control dial with the usual transmission setting legends thereon immediately adjacent the transmission control member and likewise above the hub of the steering wheel. Since the transmission control dial must be stationary, there is again the necessity of grounding the dial through the steering wheel. Necessarily, with any such relocation of the transmission control member and the control dial, the operation of the transmission controls and the steering must still be done independently without either interfering with the other.

Subsidiary to the above problems it is common, particularly with automatic transmissions, to have a parking brake of the positive kind arranged to hold the vehicle against movement when parked. It is desirable to still operate the parking brake with the transmission control member, but with provision for preventing inadvertent or accidental movement of the control member to a Park position in which the parking brake is engaged at unwanted times, particularly after the vehicle has commenced movement. To prevent this, it is advisable to require a positive act on the part of the driver which would preclude any accidental movement of the transmission control member to the Park position.

Accordingly, the invention provides a transmission control in a construction of the character wherein transmission control and steering shafts are rotatably supported by a steering column and which transmission control has a transmission control member and the control dial therefor positioned above the hub portion of a steering wheel. Furthermore, the invention furnishes for the foregoing transmission control member and control dial novel connections through the steering wheel whereby the dial is held stationary and the transmission control member is drive connected to the transmission control shaft without interfering with the independent operation of the steering shaft. Specifically, the invention proposes to intergear both the control dial with the steering column so as to prevent relative rotation therebetween and the transmission control member with the transmission control shaft so that movement is transferred therebetween.

Also, an objective of the invention is to provide the above transmission control with an arrangement whereby in moving the transmission control member to the Park position a different movement is required on the part of the operator which movement is still translated into rotary movement of the transmission control shaft. Specifically, the invention affords a novel construction wherein the transmission control member is shifted axially and through a helical connection revolves gearing which, in turn, revolves the transmission control shaft.

In carrying out the foregoing, according to a preferred embodiment of the invention, the transmission control is combined with steering and transmission control shafts, both of which are rotatably supported by a steering column with the transmission control shaft positioned outside of the steering shaft. A hub portion of the steering wheel is attached to an upper section of the steering shaft, the lower section of the steering shaft being enclosed by the transmission control shaft. The junction of the upper and lower steering shafts forms, in effect, a planet carrier and rotatably supports both a set of transmission control pinions and a set of reaction pinions. The reaction pinions mesh with a pair of reaction sun gears of the same number of teeth, one of which is connected to the steering column and the other of which extends through the hub of a steering wheel to a control dial positioned above the hub. The other set of transmission control pinions mesh with a pair of transmission control sun gears each, also, having the same number of teeth, one of which sun gears is joined to the transmission control shaft and the other of which is drive connected through the hub of the steering wheel by a helical connection with a transmission control member positioned above the hub of the steering wheel. This gearing arrangement maintains the control dial stationary at all times, while the transmission control gears, when the transmission control member is revolved, will turn the transmission control shaft to corresponding positions and these operations will not interfere with the independent operation of the steering wheel.

The helical connection between the transmission control member and the one transmission control sun gear enables the transmission control member to be shifted axially when the Park position is desired corresponding to the engaged position of the transmission parking brake. With the helical connection effective, the transmission control member is prevented from rotation and after being shifted a predetermined distance, the transmission control gearing is revolved, in turn, rotating the transmission control shaft to the Park position. When the transmission control member is moved axially to the extent of its movement, a latch will maintain it in the Park position until released by depressing a button.

The foregoing and other objects and advantages of the invention will be apparent from the following description and from the accompanying drawings, in which:

Figure 1 is a side elevational view of an installation of the transmission control;

Figure 2 is a plan view of the steering wheel and the transmission control member;

Figure 3 is a sectional view of the transmission control taken along line 3—3 of Figure 2;

Figure 4 is a perspective view of a shaft for the transmission control depicting the helical and straight grooves in the shaft;

Figure 5 is a sectional view of the gearing along line 5—5 of Figure 3;

Figure 6 is a fragmentary sectional view of a detent for the transmission control taken along line 6—6 of Figure 3;

Figure 7 is a fragmentary sectional view of a component of the gearing taken along line 7—7 of Figure 3;

Figure 8 is a fragmentary sectional view of the transmission control, similar to Figure 3, showing the control in the Park position;

Figure 9 is a fragmentary sectional view of the latch in a disengaged position taken along line 9—9 of Figure 3; and Figure 10 is a fragmentary sectional view of the latch in the engaged position taken along line 10—10 of Figure 8.

Referring to the drawings and particularly Figure 1, the numeral 10 designates a steering column appropriately supported on a vehicle body (not shown). Rotatable within the steering column 10 is a hollow lower transmission control tube or shaft 12 which, in turn, has journaled therein a lower steering shaft 14. At the bottom end of the steering column 10, a peripheral slot 16 is provided through which extends a side arm 18. Side arm 18 has the inner end attached to the transmission control shaft 12 and the outer end joined to one end of a link 20. The opposite end of the link 20 is connected to an external transmission shift lever 22, which upon rotation of the shaft 12 changes the status of a transmission 24 in a manner well known.

At the upper end of the steering column 10, a steering wheel 26 is positioned comprising a pair of oppositely disposed spokes 28 that are either integral with or attached to a hub 30. A horn ring 32 is concentric with the steering wheel 26 and has depending arms 34 terminating in a cup-shaped hub 36. The hub 36 of the horn ring 32 (see Figure 3) is tiltably secured to the steering wheel hub 30 by screws 38 and suitably insulated therefrom. Any usual horn operating mechanism may be employed, e.g., as disclosed in S.N. 674,825, filed July 29, 1957, which will upon depression of the horn ring 32 complete the horn circuit. An upper steering shaft 40 is journaled through a bearing 42, a turn signal housing 44, and an attached carrier housing 46 to the steering column 10, the latter housing 46 being fixedly secured to the steering column 10. The hub 30 of the steering wheel 26 is splined to the upper end of the steering shaft 40 and secured axially between a snap ring 48 and a lock nut 50. A conventional directional signal switch may be disposed in the turn signal housing 44 such as that disclosed in the application of William E. Brown and Ward Cole S.N. 444,068, filed July 19, 1954.

At their junction, as depicted in Figures 3 and 8, the lower steering shaft 14 and the upper steering shaft 40 are each provided with flanges which are connected by carrier pins 51 to form, in effect, a planet pinion carrier, denoted generally at 52. Journaled on the carrier pins 51 are a series of short transmission control pinions 54 and a series of elongated reaction pinions 56. The elongated reaction pinions 56 at the lower end engage a reaction sun gear 58 grounded to the steering column 10, and at the upper end engage a holding sun gear 60. Preferably, the holding sun gear 60 is formed integral with a dial tube 62 extending upwardly from the holding sun gear 60 and has the same number of teeth as reaction sun gear 58. A transmission control sun gear 64 meshes with the lower end of the short control pinions 54 and has a shaft extension 66 welded or otherwise fixed to the upper end of the lower transmission control tube 12. Engaging the opposite end of the pinions 54 is a transmission control drive sun gear 70, which has a pair of radially and oppositely disposed drive pins 72 secured thereto. As best shown by Figure 7, the inner ends of the drive pins 72 are revolvably supported by bearings 74, in turn, slidably positioned within helical grooves 76 (see Figure 4) formed in the lower end of a drive element, such as elongated shaft 78. The sun gears 64 and 70 also have the same tooth numbers.

The elongated shaft 78 has a reaction pin 80 installed therein to extend transversely on opposite sides of the rotary axis of the shaft 78. Bearings 82, similar to the bearings 74, surround the outer ends of the reaction pin 80 and are arranged, when the elongated shaft 78 is moved axially upwardly, as will be explained, to furnish a relatively frictionless fit with mating longitudinally extending slots 84 in the dial tube 62. With the reaction pin 80 engaging slots 84, there can be no relative rotation between the dial tube 62 and the elongated shaft 78. In the position shown, the reaction pin 80 and the bearings 82 are positioned within an annual pocket at the lower end of the tube 62 out of engagement with the slots 84 and the elongated shaft 78 can be rotated without restraint from the tube 62.

The lower end of the elongated shaft 78 is provided with a flange 86 against which one end of a return spring 88 abuts while the opposite end of the spring 88 engages the axially fixed drive sun gear 70 so that the spring 88 will exert a constant bias urging the elongated shaft 78 to the depicted position. The upper end of the elongated shaft 78 has mounted thereon a detent arm 90 formed with a tang 92 that, as best viewed in Figure 6, extends through a triangularly shaped slot 93 in the end of the dial tube 62 and slidably engages a longitudinally extending slot 94 in the elongated shaft 78. Hence, the detent arm 90 will rotate with the elongated shaft 78 within the limits allowed by the triangularly shaped slot 93 and will allow the elongated shaft 78 to be shifted axially relative thereto.

Supported on the upper end of the dial tube 62 is a control dial assembly, shown generally at 96, comprising a control dial 98 and a control dial housing 100. The control dial 98 is attached to the upper face of the control dial housing 100 while the control dial housing 100 is secured to the dial tube 62 through a dowel 102. A series of notches 104 are provided along the inner periphery of the control dial housing 100 corresponding to the legends 106 indicating the transmission status, e.g., Reverse, Neutral, Drive and Grade Retard. A spring biased detent 108 engages the notches 104 and maintains the detent arm 90 and as a result the elongated shaft 78 in one of the chosen positions until moved, as will be apparent.

A transmission control member, e.g., control knob 110, is affixed to the extreme upper end of the elongated shaft 78 and has a pointer 111 on the exterior face thereof (see Figure 2), which lies opposite the legends on the face of the control dial 98. Rotation of the control knob 110 by the operator will revolve the elongated shaft 78 and the detent arm 90 so that the spring biased detent 108 is overcome and the pointer 111 is aligned with the selected legend 106.

To place the transmission in the Park position, i.e., with the transmission output shaft prevented from rotation by any customary parking brake mechanism (not shown), a parking latch rod, demonstrated generally at 112, is afforded. The latch rod 112 is slidably disposed within the upper portion of the elongated shaft 78 and has an upper button end 114 extending beyond the base of the control knob 110. A locking spring 116 interposed between a shoulder 117 on the elongated shaft 78 and a flange 118 on the latch rod 112 urges the rod outwardly relative thereto. At the opposite end of the rod 112, an annular groove 119 is provided for receiving, in the position viewed in Figures 3 and 9, a pair of balls 120 oppositely disposed and partially confined by a transverse hole 122 through the elongated shaft 78. When the control knob 110 is pulled out to establish the Park position, as will be explained in the operational summary, the latch rod 112 moves therewith due to the engagement of the flange 118 with the end of the elongated shaft 78 until the openings 122 in the elongated shaft 78 are aligned with a conical annular groove 124 in the dial tube 62. The balls 120 then are forced outwardly into this groove 124 in the periphery of the rod 112 and the latch rod 112 assumes the locking position illustrated in Figures 8 and 10. In this locking position, the balls 120 have a binding engagement with the exterior surface of the rod 112, which the spring 116 helps to maintain, so that the resultant friction prevents relative axial movement between the elongated shaft 78 and the dial tube 62.

In summarizing the operation, the action of the planetary gearing will be first explained. Since the reaction sun gear 58 is held and has the same number of teeth as the holding sun gear 60, the sun gear 60 cannot rotate even though the carrier 52 and the meshing elongated pinions 56 are revolved. Consequently, the dial tube 62 always remains stationary as does the attached control dial assembly 96. This arrangement of the gearing permits the control dial assembly 96 to be positioned above the hub 30 of the steering wheel 26 but still fixed relative to the steering column 10. Rotation of the steering wheel 26 then will through the upper steering shaft 40 cause the carrier 52 and the lower steering shaft 14 to be revolved without altering this fixed relationship between the sun gears 58 and 60. The transmission control tube sun gear 64 and the drive sun gear 70 likewise have the same number of teeth and, therefore, whatever one does the other will do regardless of the rotation of the carrier 52 and the mating pinions 54.

With the foregoing gear action in mind and assuming the various parts are in the Figure 3 position, then the reaction pin 80 on elongated shaft 78 and the coacting bearings 82 are out of engagement with the slots 84 in the stationary dial tube 62. Therefore, the control knob 110 may be revolved along with elongated shaft 78 to the desired transmission setting established when the knob pointer 111 is opposite the selected legend 106 and the detent 108 engages the corresponding notch 104. Since the drive sun gear 70 is fixedly positioned axially, when the elongated shaft 78 turns, the sides of the helical grooves 76 will engage the bearings 74 and cause, through drive pins 72, the drive sun gear 70 to have the same angular travel. Rotation of sun gear 70 will be transferred by the short pinions 54 to the control tube sun gear 64 and then by the lower transmission control shaft 12, which will revolve in the same direction a corresponding amount, side arm 18, and link 20 to the external transmission shift lever 22 reconditioning the transmission 24. With the control knob 110 in the selected setting, the elongated shaft 78 will be held by the combined action of detent 108 and the stationary control dial assembly 96. As a result, the drive sun gear 70 and the control tube sun gear 64 cannot revolve and the transmission status is maintained.

Whether the control knob 110 is being turned or is stationary, the steering wheel 26 can be revolved and steering accomplished in the normal manner without interfering with the position of the control knob 110. For as explained, the carrier 52 can be revolved without altering the relative positions of the sun gears meshing with the pinions journaled thereon. Hence, the gearing enables a connection to be made between the transmission control shaft 12 and the control knob 110 through the hub 30 of the steering wheel 26 without affecting the operation of either the steering wheel 26 or the control knob 110.

When it is desired to place the transmission in the Park position, the control knob 110 is pulled outwardly as aforementioned to the Figure 8 position. However, the alignment of the longitudinally extending slots 84 in the dial tube 62 is such that the control knob 110 must be turned to the Neutral position before the knob 110 can be pulled. Then, the reaction pin 80 along with the bearings 82 can move into the slots 84 and prevent the elongated shaft 78 from rotation. After the reaction pin 80 has entered the slots 84, the drive sun gear 70 will be revolved as the drive pins 72 and the bearings 74 travel along the helical slots 76 of the axially moving elongated shaft 78, whereupon the control tube sun gear 64 and transmission control tube 12 will be rotated an amount proportional to the extent of axial travel of the shaft 78.

As mentioned, the parking latch rod 112 moves with the elongated shaft 78 until the balls 120 engage the annular groove 124 in the fixed dial tube 62 and stop movement of the shaft 78. The spring 116 becomes effective to quickly move the latch rod 112 outwardly a sufficient distance to maintain the balls 120 in binding engagement with the annular groove 124 and the elongated shaft 78 is now locked axially to the fixed upper control tube 62.

Noteworthy is the fact that the control knob 110 must be pulled out far enough for the latch rod 112 to lock and maintain the position of the elongated shaft 78 against the opposing bias of the return spring 88; otherwise, the spring 88 will return the knob 110 to the Figure 3 position. To insure that the Park position is fully established, the operator must pull the control knob 110 to the extent of its movement. Without this feature many times the control knob 110 might not be fully moved to the Park position and a subsequent slight movement of the vehicle would completely disengage the parking brake mechanism. The distance that the control knob 110 must be pulled out will, of course, be determined by the particular design and required amount of rotation that the lower transmission control shaft 12 must have to operate the parking brake mechanism.

To release the latch rod 112, it is only necessary to depress the button end 114 which will overcome the spring 116 and shift the latch rod until the balls 120 move out of the annular groove 124 and into the annular space provided by the groove 119 in the latch rod 112. The elongated shaft 78 is free of restraint and the return spring 88 will automatically restore the shaft 78 to the Figure 3 position simultaneously releasing the parking brake mechanism.

The invention is to be limited only by the following claims.

I claim:

1. In combination with a steering column, transmission control and steering shafts rotatably supported by the steering column, a rotatably and shiftably mounted transmission control member positionable in a plurality of transmission settings, a control dial provided with legends thereon corresponding to each of the transmission settings and positioned adjacent the transmission control member, a steering wheel including a hub portion drive connected to the steering shaft, the hub portion being so disposed as to have both the dial and transmission control member on one side and the steering column on the other side, planetary gearing both for drive connecting through the steering wheel the transmission control shaft and the transmission control member so as to permit independent movement of the steering and transmission control shafts and for interconnecting through the steering wheel the control dial and the steering column so as to maintain the control dial stationary with respect to the steering column, and means operative, when the transmission control member is shifted, to revolve the transmission control shaft to one of the settings.

2. In combination with a steering column, transmission control and steering shafts rotatably supported by the steering column, a rotatably mounted transmission control member positionable in a plurality of transmission settings, a control dial provided with legends thereon corresponding to each of the transmission settings and positioned adjacent the transmission control member, a steering wheel including a hub portion drive connected to the steering shaft, the hub portion being so disposed as to have both the dial and transmission control member on one side and the steering column on the other side, and planetary gearing comprising a transmission control planetary gear set for drive connecting through the steering wheel the transmission control shaft and the transmission control member so as to permit independent movement of both the steering and transmission control shafts and a reaction planetary gear set for interconnecting through the steering wheel the control dial and the steering column so as to maintain the control dial stationary with respect to the steering column.

3. In combination with a steering column, transmission control and steering shafts rotatably supported by the steering column, a rotatably mounted transmission control member positionable in a plurality of transmission settings, a control dial provided with legends thereon corresponding to each of the transmission settings and positioned adjacent the transmission control member, a steering wheel including a hub portion drive connected to the steering shaft, the hub portion being so disposed as to have both the dial and transmission control member on one side and the steering column on the other side, and planetary gearing comprising control and reaction pinions revolvable with the steering wheel, first and second reaction gears meshing with the reaction pinion, the first and second reaction gears being connected through the steering wheel, respectively, to the control dial and the steering column and so constructed as to prevent relative rotation therebetween, first and second transmission control gears meshing with the control pinion, the first and second transmission control gears being drive connected through the steering wheel, respectively, to the transmission control member and the transmission control shaft so as to permit independent movement of both the steering and transmission control shafts.

4. In combination with a steering column, transmission control and steering shafts rotatably supported by the steering column, the steering shaft being disposed within the transmission control shaft, a rotatably mounted transmission control member positionable in a plurality of transmission settings, a control dial provided with legends thereon corresponding to each of the transmission settings and positioned adjacent the transmission control member, a steering wheel including a hub portion drive connected to the steering shaft, the hub portion being so disposed as to have both the dial and transmission control member on one side and the steering column on the other side, and planetary gearing comprising control and reaction pinions revolvable with the steering wheel, first and second reaction gears meshing with the reaction pinion, the first and second reaction gears being connected through the steering wheel, respectively, to the control dial and the steering column and so constructed as to prevent relative rotation therebetween, first and second transmission control gears meshing with the control pinion, the first and second transmission control gears being connected through the steering wheel, respectively, to the transmission control member and the transmission control shaft so as to permit independent movement of both the steering and transmission control shafts.

5. In combination with a steering column, transmission control and steering shafts rotatably supported by the steering column, the steering shaft being disposed within the transmission control shaft, a rotatably mounted transmission control member positionable in a plurality of transmission settings, a control dial provided with legends thereon corresponding to the transmission settings and positioned adjacent to the transmission control member, a steering wheel including a hub portion drive connected to the steering shaft, the hub portion being so disposed as to have both the dial and a transmission control member on one side and the steering column on the other side, and planetary gearing comprising control and reaction pinions revolvable with the steering wheel, a pair of reaction sun gears of the same tooth numbers meshing with the reaction pinion, one of the pair of reaction sun gears being connected to the control dial and the other to the steering column through the steering wheel so as to prevent relative rotation therebetween, a pair of control sun gears of the same tooth numbers meshing with the control pinion, one of the pair of control sun gears being connected to the transmission control member and the other to the transmission control shaft so as to transfer drive therebetween through the steering wheel.

6. A control for a vehicle transmission of the character that has a parking brake with an engaged position comprising, in combination, a steering column, transmission control and steering shafts rotatably supported by the steering column, the steering shaft being disposed within the transmission control shaft, a transmission control member mounted for movement in plural planes to a plurality of positions corresponding to different ranges of transmission operation and a Park position corresponding to the parking brake engaged position, a control dial positioned adjacent the transmission control member and provided with legends thereon denoting each of the transmission control member positions, a steering wheel including a hub portion drive connected to the steering shaft, the hub portion being so disposed as to have both the dial and the transmission control member on one side and the steering column on the other side, planetary gearing both for interconnecting the steering column and the control dial through the steering wheel so as to maintain the control dial stationary with respect to the steering column and for revolving the transmission control shaft, and means drive connecting the planetary gearing to the transmission control member through the steering wheel so that when the transmission control member is moved in the plural planes to different ones of the plurality positions and to the Park position the gearing will revolve the transmission control shaft to a corresponding position.

7. A control for a vehicle transmission of the character that has a parking brake with an engaged position comprising, in combination, a steering column, transmission control and steering shafts rotatably supported by the steering column, a rotatably and shiftably mounted transmission control member having a plurality of positions corresponding to different ranges of transmission operation and a Park position corresponding to the parking brake engaged position, a control dial positioned adjacent the transmission control member and provided with legends thereon denoting each of the transmission control member positions, a steering wheel including a hub portion drive connected to the steering shaft, the hub portion being so disposed as to have both the dial and the transmission control member on one side and the steering column on the other side, planetary gearing both for interconnecting the steering column and the control dial through the steering wheel so as to maintain the control dial stationary with respect to the steering column and for revolving the transmission control shaft, and means drive connecting the planetary gearing to the transmission control member through the steering wheel so that when the transmission control member is rotated and shifted the gearing will revolve the transmission control shaft.

8. A control for a vehicle transmission of the character that has a parking brake with an engaged position comprising, in combination, a steering column, transmission control and steering shafts rotatably supported by the steering column, the steering shaft being disposed within the transmission control shaft, a transmission control member mounted both for rotatable movement to a plurality of positions corresponding to different ranges of transmission operation and for shiftable movement to a Park position corresponding to the parking brake engaged position, a control dial positioned adjacent the transmission control member and provided with legends thereon denoting each of the transmission control member positions, a steering wheel including a hub portion drive connected to the steering shaft, the hub portion being so disposed as to have both the dial and the transmission control member on one side and the steering column on the other side, planetary gearing both for interconnecting the steering column and the control dial through the steering wheel so as to maintain the control dial stationary with respect to the steering column and for revolving the transmission control shaft, and means drive connecting the planetary gearing to the transmission control member through the steering wheel so that when the transmission control member is rotated and shifted, respectively, to different ones of the plurality of positions and to the Park position the gearing will revolve the transmission control shaft to a corresponding position.

9. A control for a vehicle transmission of the character that has a parking brake with an engaged position comprising, in combination, a steering column, transmission control and steering shafts rotatably supported by the steering column, the steering shaft being disposed within the transmission control shaft, a transmission control member mounted both for rotatable movement to a plurality of positions corresponding to different ranges of transmission operation and for shiftable movement to a Park position corresponding to the parking brake engaged position, a control dial positioned adjacent the transmission control member and provided with legends thereon denoting each of the transmission control member positions, a steering wheel including a hub portion drive connected to the steering shaft, the hub portion being so disposed as to have both the dial and the transmission control member on one side and the steering column on the other side, planetary gearing both for interconnecting the steering column and the control dial through the steering wheel so as to maintain the control dial stationary with respect to the steering column and for revolving the transmission control shaft, and means drive connecting the planetary gearing to the transmission control member through the steering wheel so that when the transmission control member is rotated and shifted, respectively, to different ones of the plurality of positions and to the Park position the gearing will revolve the transmission control shaft to a corresponding position, and latch means for holding the transmission control member in the Park position.

10. A control for a vehicle transmission of the character that has a parking brake with an engaged position comprising, in combination, a steering column; transmission control and steering shafts rotatably supported by the steering column; a rotatably and shiftably mounted transmission control member having a plurality of positions corresponding to different ranges of transmission operation and a Park position corresponding to the parking brake engaged position; a control dial positioned adjacent the transmission control member and provided with legends thereon denoting each of the transmission control member positions; a steering wheel including a hub portion drive connected to the steering shaft; the hub portion being so disposed as to have both the dial and the transmission control member on one side and the steering column on the other side; planetary gearing including a reaction planetary gear set for interconnecting the control dial to the steering column through the steering wheel so as to prevent relative rotation therebetween, and a transmission control planetary gear set drive connected to the transmission control shaft; and means drive connecting the transmission control planetary gear set to the transmission control member through the steering wheel so that when the transmission control member is rotated and shifted, respectively, to different ones of the plurality of positions and to the Park position the gearing will revolve the transmission control shaft to a corresponding position.

11. A control for a vehicle transmission of the character that has a parking brake with an engaged position comprising, in combination, a steering column; transmission control and steering shafts rotatably supported by the steering column; the steering shaft being disposed within the transmission control shaft; a rotatably and shiftably mounted transmission control member having a plurality of positions corresponding to different ranges of transmission operation and a Park position corresponding to the parking brake engaged position; a control dial positioned adjacent the transmission control member and provided with legends thereon denoting each of the transmission control member positions; a steering wheel including a hub portion drive connected to the steering shaft; the hub portion being so disposed as to have both the dial and the transmission control member on one side and the steering column on the other side; planetary gearing including control and reaction pinions revolvable with the steering wheel, first and second reaction gears meshing with the reaction pinion, the first and second reaction gears being connected, respectively, to the control dial and the steering column through the steering wheel and so constructed as to prevent relative rotation between the steering column and the control dial, and first and second transmission control gears meshing with the control pinion, the second transmission control gear being connected to the transmission control shaft; and means for connecting the first transmission control gear to the transmission control member so that when the transmission control member is rotated and shifted, respectively, to different ones of the plurality of positions and to the Park position the gearing will revolve the transmission control shaft to a corresponding position.

12. A control for a vehicle transmission of the character that has a parking brake with an engaged position comprising, in combination, a steering column; transmission control and steering shafts rotatably supported by the steering column; a transmission control member mounted both for rotatable movement to a plurality of positions corresponding to different ranges of transmission operation and for shiftable movement to a Park position corresponding to the parking brake engaged position; a control dial positioned adjacent the transmission control member and provided with legends thereon denoting each of the transmission control member positions; a steering wheel including a hub portion drive connected to the steering shaft; the hub portion being so disposed as to have both the dial and the transmission control member on one side and the steering column on the other side; planetary gearing including transmission control and reaction pinions revolvable with the steering wheel, a pair of reaction gears of the same number of teeth meshing with the reaction pinion, one of the pair of reaction gears being connected to the control dial and the other to the steering column so as to prevent relative rotation therebetween, and a pair of transmission control gears of the same number of teeth meshing with the transmission control pinions, one of the pair of transmission control gears being drive connected to the transmission control shaft; means for drive connecting the other of the pair of control gears to the transmission control member through the steering wheel so that when the transmission control member is rotated and shifted, respectively, to different ones of the plurality of positions and to the Park position the gearing will revolve the transmission control shaft to a corresponding position; and latch means for holding the transmission control member in the Park position.

13. A control for a vehicle transmission of the character that has a parking brake with an engaged position comprising, in combination, a steering column; transmission control and steering shafts rotatably supported by the steering column; the steering shaft being disposed within the transmission control shaft; a transmission control member mounted both for rotatable movement to a plurality of positions corresponding to different ranges of transmission operation and for shiftable movement to a Park position corresponding to the parking brake engaged position; a control dial positioned adjacent the transmission control member and provided with legends thereon denoting each of the transmission control member positions; a steering wheel including a hub portion drive connected to the steering shaft; the hub portion being so disposed as to have both the dial and the transmission control member on one side and the steering column on the other side; planetary gearing including transmission control and reaction pinions revolvable with the steering wheel, first and second reaction gears meshing with the the reaction pinion, the first and second reaction gears being connected, respectively, to the control dial and to the steering column and so constructed as to prevent relative rotation between the control dial and the steering column, and first and second transmission control gears meshing with the control pinion, the second transmission control gear being connected to the transmission control shaft; a drive element mounted for axial and rotatable movements; the drive element having a helical drive connection at one end with the first transmission control gear and extending through the hub portion of the steering wheel so that the opposite end is connected to the transmission control member; means for preventing rotation of the drive element when shifted axially; the transmission control member when revolved to one of the plurality of positions causing the drive element through the helical drive connection to revolve the first transmission control gear and thereby rotate both the second transmission control gear and the transmission control shaft therewith to a corresponding position; the transmission control member when shifted axially to the Park position moving the drive element therewith; the drive element in shifting to the Park position being prevented from rotation so that the first transmission control gear is revolved by the helical drive connection thereby revolving the second transmission control gear and the transmission control shaft therewith to the Park position; and a latch for releasably holding the drive element in the Park position.

14. A control for a vehicle transmission of the character that has a parking brake with an engaged position comprising, in combination, a steering column; transmission control and steering shafts rotatably supported by the steering column; the steering shaft being disposed within the transmission control shaft; a transmission control member mounted both for rotatable movement to a plurality of positions corresponding to different ranges of transmission operation and for shiftable movement to a Park position corresponding to the parking brake engaged position; a control dial positioned adjacent the transmission control member and provided with legends thereon denoting each of the transmission control member positions; a steering wheel including a hub portion drive connected to the steering shaft, the hub portion being so disposed as to have both the dial and the transmission control member on one side and the steering column on the other side; planetary gearing including transmission control and reaction pinions revolvable with the steering wheel, first and second sun reaction gears of the same number of teeth meshing with the reaction pinion, the first and second reaction sun gears being connected, respectively, to the control dial and to the steering column so as to prevent relative rotation therebetween, and first and second transmission control sun gears of the same number of teeth meshing with the control pinion, the second transmission control sun gear being connected to the transmission control shaft; a drive element mounted for axial and rotatable movements; the drive element having a helical drive connection at one end with the first transmission control sun gear and extending through the hub portion of the steering wheel so that the opposite end is connected to the transmission control member; means for preventing rotation of the drive element when shifted axially; the transmission control member when revolved to one of the plurality of positions causing the drive element through the helical drive connection to revolve the first transmission control sun gear and thereby rotate both the second transmission control sun gear and the transmission control shaft therewith to a corresponding position, the transmission control member when shifted axially to the Park position moving the drive element therewith; the drive element in shifting to the Park position being prevented from rotation by said means so that the first transmission control sun gear is revolved by the helical drive connection thereby revolving the second transmission control sun gear and the transmission control shaft therewith to the Park position; and a latch for releasably holding the drive element in the Park position.

No references cited.